United States Patent [19]

Maekawa et al.

[11] 4,308,542

[45] Dec. 29, 1981

[54] INK JET RECORDING METHOD

[75] Inventors: Masakazu Maekawa; Sukenori Nakamura, both of Shizuoka; Masatoshi Sugiyama; Hideo Odawara, both of Tokyo, all of Japan

[73] Assignee: Fuji Photo Film Co., Ltd., Minami-ashigara, Japan

[21] Appl. No.: 149,614

[22] Filed: May 14, 1980

[30] Foreign Application Priority Data

May 14, 1979 [JP] Japan .................................. 54-58789

[51] Int. Cl.³ ...................... G01D 15/34; G01D 15/16

[52] U.S. Cl. ...................................... 346/1.1; 162/146; 162/134; 346/75; 346/135.1; 427/288; 427/372.2; 428/211; 428/537

[58] Field of Search ...................... 346/1.1, 135.1, 75; 428/211, 537; 427/288, 265, 426, 372.2; 162/146, 134; 400/126

[56] References Cited

U.S. PATENT DOCUMENTS

| | | | |
|---|---|---|---|
| 3,889,270 | 6/1975 | Hoffmann | 346/1.1 |
| 4,095,233 | 6/1978 | Goffe | 346/1.1 X |
| 4,095,234 | 6/1978 | Mito | 346/75 |
| 4,166,758 | 9/1979 | Watanabe | 162/146 X |

OTHER PUBLICATIONS

Crooks et al, Substrate for Colored Ink Jet Printing, IBM TDB, vol. 21, No. 6, Nov. 1978, p. 2505.

Edds et al, Paper Treatment Enhancement of Ink Drying in Ink Jet Printers, IBM TDB, vol. 22, No. 8A, Jan. 1980, pp. 3301–3302.

*Primary Examiner*—Joseph W. Hartary

*Attorney, Agent, or Firm*—Sughrue, Mion, Zinn, Macpeak and Seas

[57] ABSTRACT

An ink-jet recording method is described comprising applying an ink-jet onto a synthetic pulp paper and then heat-treating the synthetic pulp paper to fuse synthetic pulp, to obtain an ink-jet recording having high density, water resistance, and color-reproduction properties.

12 Claims, No Drawings

INK JET RECORDING METHOD

BACKGROUND OF THE INVENTION

1. Field of the Invention

This invention relates to an ink jet recording method and more particularly to an ink jet recording method which comprises applying ink jet recording onto a synthetic pulp paper and then heat-treating the synthetic pulp paper to fuse synthetic pulp and which permits ink recording of high recording density, excellent water resistance, and excellent color reproduction for multicolor recording.

2. Description of the Prior Art

Because of its quietness, fast recording capability, and adaptability to paper of ordinary grade, ink-jet recording is becoming increasingly popular; for example, one application is in computer terminal printers. Furthermore, the ink-jet method can be used to achieve multicolor recording using a plurality of ink nozzles. However, multicolor ink-jet recording involves problems not encountered in monochrome recording. In monochrome recording, one point on a recording paper is subjected to only one recording operation, and therefore satisfactory recording is obtainable most types of paper, e.g., fine paper, rolled paper for payment slips, and papers having greater degree of ink absorption than those previously mentioned. In multicolor recording, ink is squirted from two or more nozzles, and two or more (sometimes four) dots may be merged at one point on the recording paper. Unless the ink drop is absorbed quickly by the layer of paper, it merges with a subsequent ink drop applied on the same point of paper, causing flowing or flying of the ink and smearing thereof on the white background of the paper. If the recorded paper is handled carelessly, its surface may be rubbed to deface the image. Therefore, the use of recording paper having high ink absorption rate is particularly needed in multicolor recording.

Using a recording paper which absorbs ink well, an ink dot generally spreads and at the same time penetrates deep into the paper. For example, paper made as bulky as possible without using a sizing agent absorbs ink very well, and is therefore feasible for use in multicolor ink-jet printing. But the ink dots spread so much on this paper that they give low resolution, and ink penetrates the paper so deep that light scattering due to the interstices in the upper layer of the paper makes the resulting image whitish and less sharp. If four-color (cyan, magenta, yellow and Indian ink) recording is effected on paper of such high ink absorption, the depth of penetration of the first ink dot in the paper is enough to reduce its visibility from above, resulting in poor color reproduction. Pigment-coated paper prepared by coating a pigment and an adhesive on sized paper has low ink absorption properties and cannot be used for multi-color ink jet recording.

As will be understood from the above discussion, to produce an image of high density, resolution and good color reproduction by multicolor ink-jet printing, the following three apparently incompatible requirements must be satisfied: (1) the coloring component of the ink should not show appreciable spreading on the recording paper used; (2) the greater part of said component should remain on the surface of the paper without penetrating deeply into the paper; and (3) the recording paper should have absorbing properties. Several developments have been made in order to achieve such objectives.

As desclosed in Japanese Patent Application (OPI) No. 53012/1977 (The term "OPI" as used herein refers to a "published unexamined Japanese patent application".), when pigment is coated on paper with a low degree of sizing, the major portions of the pigment and the adhesive penetrate into the paper, providing a pigment-filled paper in which the pigment is filled in the pores of the paper. This pigment-filled paper has ink absorption properties and recording density intermediate between the bulky paper containing no sizing agent and the pigment-coated paper. Although the pigment-filled paper has higher ink absorption properties than the pigment-coated paper, they are not sufficient to such an extent that it can be used for multi-color recording. Japanese Patent Application (OPI) No. 49113/78 discloses an ink-jet recording paper wherein paper containing a fine powder of ureaformalin resin is impregnated with a water-soluble polymer. Japanese Patent Application (OPI) No. 74340/77 discloses an ink-jet recording paper having a specified degree of air permeability which absorbs ink in a specified period of time. However, the concept common to these three conventional techniques is to sacrifice ink absorption in order to provide high resolution and density. Although they achieve the intended object to some extent, the resulting paper does not absorb ink well and is not suitable for use in multicolor ink-jet recording. Therefore, there has been a demand in the industry for multicolor ink-jet recording paper satisfying the aforementioned three conditions.

As described above, no ink recording paper has hitherto been obtained which has ink absorption properties suitable for use in multi-color recording and which can provide excellent recording density and color-reproduction.

Forthermore, for conventional ink jet recording papers in which almost no sizing agents are used to improve ink absorption properties, the water resistance of the recording paper is poor, an aqueous ink is generally often used as a recording ink, and the colored recording formed by the ink jet, when moistened with water, runs and elutes, fading in color. Thus they cannot be used for outdoor notification.

SUMMARY OF THE INVENTION

An object of this invention is to provide an ink recording method which provides ink-jet recordings having high recording density.

Another object of this invention is to provide an ink-jet recording method which provides multicolor ink-jet recordings having high recording density and good color reproduction.

Still another object of this invention is to provide an ink-jet recording method which provides ink-jet recordings having high water resistance.

As a result of extensive investigations to solve the drawbacks of conventional ink-jet recording papers, it has now been found that ink-jet recordings having high density and water resistance can be obtained by employing a synthetic pulp paper as an ink-jet recording paper and by heat-treating the synthetic pulp paper after the ink-jet recording to fuse synthetic pulp obtained in the synthetic pulp paper.

This invention, therefore, provides an ink-jet recording method wherein a synthetic pulp paper is subjected to ink-jet recording and then to a heat-treatment to fuse synthetic pulp contained therein.

DETAILED DESCRIPTION OF THE INVENTION

Paper made up of synthetic pulp has good ink absorption properties similar to those of conventional ink-jet recording paper, and can be used for multicolor ink-jet recording. However, unless additional treatments are applied, the recording density is low and the water resistance is poor also as in the case of conventional ink-jet recording papers.

On heat-treating the ink-jet recorded-synthetic pulp paper, the synthetic pulp fuses, making the synthetic pulp portion transparent, decreasing the voids in the paper, reducing the light scattering in the paper, increasing the recording density, and permitting the formation of sharp images. Furthermore, color reproduction for multicolor recording is improved. In addition, the fused synthetic pulp forms a water-repellent continuous film, providing excellent water resistance to the recording paper and the colored image.

The spread of ink along the lateral direction, which inversely affects the resolution of the image, is not changed by the fusion of the synthetic pulp, but it can be controlled by incorporating pigments and water-soluble adhesives therein in advance, as is later described, which do not inhibit the ink absorption properties, into the synthetic pulp paper.

Synthetic pulp paper used according to this invention includes those papers made up mainly of synthetic pulp and wood pulp as well as paper made up of synthetic pulp alone. If desired, synthetic fibers, inorganic fibers, vegetable fibers except for wood pulp, etc. can be added.

The synthetic pulp as herein used comprises thermoplastic polymers, for example, homo- or co-polymers of vinyl monomers such as ethylene, propylene, acrylonitrile, styrene, acrylic ester, vinyl acetate, vinyl chloride and vinylidene chloride, polyamides and polyesters.

The synthetic pulp can be produced, for example, by: (1) the polymerization method, as described in Japanese Patent Publication No. 21898/1972 and Japanese Patent Application (OPI) No. 29675/1972; (2) the split method, as described in Japanese Patent Publication Nos. 9651/1960 and 7881/1973, Japanese Patent Application (OPI) No. 1402/1973; (3) the flash spinning method, as described in Japanese Patent Publication Nos. 16460/1961 and 28125/1965; (4) the fibrid method as described in Japanese Patent Publication No. 11851/1960; and (5) the emulsion flash spinning method as described in Japanese Patent Publication No. 32133/1972.

The synthetic pulp is similar in form to beaten wood pulp and, in general, it has an average length of 0.1 to 5 mm and a surface area of 0.5 to 100 $M^2/g$. In the practice of the invention, the polyethylene synthetic pulp produced by the polymerization method is especially suitable for the reasons that the melting point is low, paper-production is facilitated, and paper of uniform properties can be obtained. The preferred examples of wood pulps which can be mixed with the synthetic pulp include a bleached wood pulp having a high brightness such as NBKP, LBKP, NBSP and LBSP.

The mixing ratio of the synthetic pulp is suitably 10 to 100% by weight of the total weight. At a mixing ratio of 25% by weight or more, the transparency of the recording paper is increased by the heat-treatment, permitting ink-jet recording particularly suitable for observation by transmitted light. The preferred ranges for reflective and transparent embodiments are 25 to 80% and 25 to 100% by weight, respectively.

Synthetic pulp papers which can be made transparent and water-resistant by application of known heat-treatments can be used in the practice of this invention, such heat-treatments being described, for example, in Japanese Patent Application (OPI) Nos. 35608/1974, 42902/1974, 81608/1974, 12302/1975, 35409/1975, 118008/1975, 155703/1975, 30739/1976, 32803/1976, Japanese Utility Model Application (OPI) Nos. 116464/1974 (The term "OPI" as used herein refers to a "published unexamined Japanese utility model application".), 135507/1974, 17506/1976, 17507/1976, and 43604/1976.

Wet-end additives can be added to the synthetic pulp paper for the purpose of increasing ink-jet recording suitability and practical performance. That is, wet-end additives are added to fiber suspensions prior to the forming of webs for distribution throughout the fiber suspensions. Since a sizing agent interferes with the absorption of ink, it is generally preferred not to add a sizing agent to an ink absorption layer.

Additives which may be added to the synthetic pulp paper include a wet strength-improving agent, such as a melamin resin, a urea resin, a polyamide-polyamineepichlorohydrin resin, and polyethyleneimine; a dry strength-improving agent, such as polyacrylamide and starch; a fixing agent such as aluminum sulfate; a coloring agent such as dye, pigment and fluorescence dye; and a filler such as clay, talc, calcium carbonate, titanium dioxide, kieselguhr, acid clay, a synthetic silicate salt, and a fine powder of a urea resin, polystyrene or polyethylene.

Fillers generally have the effect of improving the ink absorption properties. It is also possible to provide the filler with specific effects. For example, since acid clay absorbs a basic dye contained in an aqueous ink, it controls the spread of the ink and increases the recording density. Thermoplastic resin fine powder such as polyethylene fine powder fuses by heat-treatment after ink-jet recording, effectively improving the recording density in the same manner as the synthetic pulp. The addition of a cationic polymer prevents the elution of direct dye and acid dye from an aqueous ink used for ink-jet recording and plays an auxiliary part in the water resistance-improving effect due to the fusion of synthetic pulp. The addition of a water-absorbing substance such as a hydrolyzate of a starch-acrylonitrile graft polymer and polyacrylamide gel increases the ink absorption properties.

The synthetic pulp paper may be a single layer product as produced by a Fourdrinier paper machine. Combination paper as produced by a cylinder paper machine and a Fourdrinier-cylinder combination paper machine, when changed in the layer construction, can provide specific effects.

For example, a recording paper prepared at a high synthetic pulp mixing ratio becomes transparent by the heat-treatment after the ink-jet recording, providing recording images suitable for the transmitted light observation, but not suitable for reflected light observation. In this case, however, when a combination paper is employed consisting of an upper layer and a lower layer, said upper layer being an ink-jet recording layer prepared by mixing synthetic pulp and said lower layer being an ink penetration prevention and reflection layer not including synthetic pulp but which is prepared rather by adding a sizing agent and a filler to wood pulp, the heat-treatment after the ink-jet recording produces a layer construction of an ink-containing transparent layer existing on an opaque layer having a high brightness and, as a result, sharp reflective images of markedly high density can be obtained. Furthermore, when a dye absorbing substance such as acid clay is added to only the upper pulp layer of an ink-jet recording layer containing synthetic pulp, and no sizing agent is added to the lower layer comprising wood pulp containing no synthetic pulp (in order to keep it water-absorbent), the dye in the ink is adsorbed onto the upper layer and solvents such as water are absorbed by the lower layer, resulting in the formation of images having good ink absorption properties and high density.

The drying by the paper machine is carried out at such a temperature so as not to fuse the synthetic pulp to the extent that a reduction in ink absorption properties is caused, and excessive calender processing is not preferred because it decreases the void volume. Pigments, adhesives, etc. may be saturated on the synthetic pulp paper by use of a size press, an off-machine saturator, etc., if desired.

Water-soluble adhesives such as starch are effective in improving the surface strength, but water-soluble adhesives of low hydrophilic nature cannot be used because they reduce the ink absorption properties. Water-soluble adhesives of high hydrophilic nature, such as polyvinyl alcohol, gelatin, sodium alginate, hydroxyethyl cellulose, carboxymethyl cellulose, polyacrylamide, sodium polystyrene sulfonate, sodium polyacrylate, polydimethyldiallyl ammonium chloride, polyvinylbenzyltrimethyl ammonium chloride, polyvinyl pyridine, polyvinyl pyrrolidone, polyethylene oxide, and a hydrozate of a starch-acrylonitrile graft polymer are effective not only in increasing the surface strength, but also in improving the ink absorption properties. These water-soluble adhesives may be used in combination with water-soluble adhesives, such as a melamine resin, an epoxy resin, and isocyanate compounds, for use in improving the water resistance.

Where the water-soluble adhesive is a polymer electrolyte, it can prevent the elution of the dye in the ink, provided said dye has the opposite electric charge to that of the polymer electrolyte; the water-soluble adhesive also increases the water resistance due to the synthetic pulp.

Latexes reduce the ink absorption properties when used in large amounts, but when coated within such a range so as not to inhibit the ink absorption properties, it can effectively increase the surface strength and water resistance. The preferred amount of the latexes added is about 2 to 5% by weight.

The saturating of pigment into synthetic pulp paper is effective in increasing the ink absorption properties and in preventing the spread of the ink dot. However, saturating a large amount of pigment having a high refractive index, such as titanium dioxide, is not desirable in that it increases the light scattering of the synthetic pulp-fused layer and decreases the recording density. Examples of such pigments as usable for this coating are clay, talc, calcium carbonate, kieselguhr, acid clay, synthetic silicate salts, silica sol, aluminum sol, and fine resin powders of a urea resin, polystyrene, polyethylene, etc. Since acid clay, silica sol, aluminum sol, etc. adsorb the dye in the ink, they can be effectively used for increasing the water resistance of the dye and for increasing the density by preventing the penetration of the dye in the ink. These pigments are used in combination with adhesives such as water-soluble adhesives and latexes as described above.

The wood pulp existing in admixture with the synthetic pulp is not fused and made transparent by the heat-treatment. Therefore, the saturating of synthetic pulp paper with a transparentizing agent having a refractive index close to that of the wood pulp prior to the ink jet recording makes the ink jet recording layer more transparent and increases the recording density. Transparentizing agent which can be used for this purpose include emulsions of colorless, liquid and non-volatile substances such as dioctyl phthalate, tricresyl phosphate, fluid paraffin and polybutene, as described, for example, Japanese Patent Publication Nos. 36366/76, 36367/76 and 1001/77.

The ink for use in the ink-jet recording of the synthetic pulp paper according to this invention is generally an aqueous ink, and it comprises a water-soluble dye, a wetting agent, a dye solubilizing agent, a mildew-proofing agent, water, a water-compatible organic solvent, etc., as described, for example, in Japanese Patent Application (OPI) Nos. 12105/1972, 97620/1974, 143602/1975, 102407/1975, 129310/1976, 137506/1976, 137505/1976, 115106/1976, 139408/1976, 12008/1977, 12009/1977, 12010/1977, 89534/1974, etc. In addition, an oily ink as described in Japanese Patent Application (OPI) Nos. 84311/1975, 28007/1976, etc. can be used in the practice of this invention.

The heat-treatment of the synthetic pulp paper can be effected by procedures using a cylinder drier, a hot air drier, a heat calender, a hot press, an iron, infrared rays and microwaves, a corona treatment, a flame treatment, and so forth.

Application of a heat-treatment and a pressure treatment at the same time or successively is a preferred manner, i.e., such manner increases the reduction in the void volume of the synthetic pulp paper and the extent to which the recording density and water resistance are increased. For the pressure treatment, a machine calender, a super calender, a gross calender, a press, etc. can be employed. The heat-treatment of the synthetic pulp paper is desirably carried out in such a manner that the temperature of the synthetic pulp paper is above the softening point of the synthetic pulp, preferably above the melting point although it varies depending upon the extent to which the pressure treatment is applied at the same time.

Heat-treatment conditions of the synthetic pulp paper are determined by the kind of the synthetic pulp, the mixing ratio of the synthetic pulp, the basis weight of the synthetic pulp paper, the required quality, etc. Where a high pressure polyethylene synthetic pulp is used, it is suitable that the temperature of the synthetic pulp paper is from 100° C. to 150° C., the heat-treatment time is for a period of from 1 second to 10 minutes, the pressure is 0 to 100 $kg/cm^2$, and the pressure application time is 0 to 10 minutes.

According to the ink-jet recording method of this invention, the following novel effects can be obtained:

(1) Both the ink-absorption properties and the ink-jet recording density are excellent.

(2) The water resistance of the ink-jet recording paper and the image areas are excellent.

(3) Display by the use of transmitted light is possible.

(4) Color reproduction using multicolor ink-jet recording is excellent.

(5) By using a combination paper which contains the synthetic pulp only in an ink-jet recording layer, images having higher reflective densities than a single layer paper can be obtained.

The following examples are given to illustrate this invention in greater detail.

EXAMPLE 1

Seventy parts of NBSP was beaten to a freeness of 500 ml and mixed with 30 parts of high pressure polyethylene synthetic pulp having an average fiber length of 0.9 mm and a melting point of 131° C. A polyamide-polyamine-epichlorohydrin resin was added thereto in an amount of 0.5 part, and the resulting mixture was processed with a Fourdrinier paper machine to provide a paper of a basis weight of 70 g/m². This paper is named "Recording Paper 1".

100 parts of NBSP was beaten to a freeness of 500 ml and 0.5 part of a polyamide-polyamine-epichlorohydrin resin was added thereto. The resulting mixture was processed with a Fourdrinier paper machine to provide a paper of a basis weight of 70 g/m². This paper is named "Recording Paper 2".

Onto Recording Papers 1 and 2, four color inks of cyan, magenta, yellow and sumi (Indian ink), each containing a direct dye as a coloring component, were successively projected onto the paper by use of an ink-jet printer with four ink-jet nozzles, to obtain a multicolor recording.

For both recording papers in ink absorption properties at the points where the four color inks were superposed was good, but the recording density was low. In particular, for Recording Paper 1 wherein the synthetic pulp was used together, only a faded color was obtained.

After the ink-jet recording Recording Papers 1 and 2 were subjected to a heat-treatment by pressing an iron with a surface temperature of 135° C. As indicated in Table 1, the recording density and water resistance of Recording Paper 1 were increased by the heat-treatment. No changes occurred in Recording Paper 2. On dipping these recording papers in water, the elution of the dye was observed for Recording Papers 1 and 2 which had been subjected to no heat-treatment and Recording Paper 2 which had been subjected to the heat-treatment, whereas almost no elution occurred for Recording Paper 1 which has been subjected to the heat-treatment.

TABLE 1

| | Recording Paper | | | |
|---|---|---|---|---|
| | 1 | 1 | 2 | 2 |
| Heat-treatment | No | Yes | No | Yes |
| Density*1 | 0.72 | 1.05 | 0.85 | 0.85 |
| Water Resistance*2 | Not good (Elution of Dye) | Good (Slight Elution of Dye) | Not good (Elution of Dye) | Not good (Elution of Dye) |
| Ink Absorption*3 Properties | Good (No flow) | Good (No flow) | Good (No flow) | Good (No flow) |

*1 The rush portion of the cyan ink was measured.
*2 After dipping in water at 220° C. for 10 minutes, the elution of the dye was observed.
*3 The flow-out of the ink at the rush portion of the four colors was observed.

EXAMPLE 2

Gelatin was saturated in an amount of 2 g/m² on the surface of Recording Paper 1 as used in Example 1. This recording paper was subjected to the same ink-jet recording and heat-treatment as in Example 1.

The ink absorption properties and recording density of this recording paper were equal to those of Recording Paper 1, but the spread of the ink dot was small. For Recording Paper 1 of Example 1, the shape of dot was irregular and the diameter was 200 to 250μ, whereas for the recording paper of Example 2, the shape of dot was nearly circular and the diameter was about 200μ. The image sharpness of this recording paper was superior to that of Recording Paper 1 of Example 1.

In addition, when observed with transmitted light, the image was sharp and bright in comparison with that prior to heat-treatment. This indicates that the recording paper is suitable for use with transmitted light.

EXAMPLE 3

A saturating solution (solids content 30% by weight) consisting of 100 parts of acid clay and 20 parts of a polyethylene ionomer emulsion was saturated in an amount of 5 g/m² on one surface of Recording Paper 1 of Example 1. Three aqueous color inks of cyan, magenta and yellow, each containing a basic dye as a coloring matter, were successively projected onto the above prepared recording paper to effect multicolor recording, which was then subjected to a heat-treatment.

The sharpness and water resistance of the image formed in this recording paper were superior to those of Recording Paper 1 of Example 1.

EXAMPLE 4

Thirty parts of LBSP was beaten to a freeness of 350 ml and mixed with 70 parts of high pressure polyethylene synthetic pulp having an average fiber length of 0.9 mm and a melting point of 131° C. 0.3 part of polyethyleneimine was added thereto to provide an upper layer material.

Then, 100 parts of LBKP was beaten to a freeness of 500 ml and a mixture of 5 parts of titanium white, 1 part of rosin, 2 parts of aluminum sulfate was added thereto to provide a lower layer material.

Thereafter, a two layer combination paper with a basis weight of 100 g/m² was produced by combining the upper layer of 40 g/m² and the lower layer of 60 g/m² by use of a cylinder paper machine.

The same ink-jet recording as employed in Example 1 was applied onto the upper layer of this recording paper. The ink absorption properties were good, but the recording density was low.

This recording paper after the recording was once passed between two chilled rolls with a surface temperature of 135° C. at a linear pressure of 50 kg/cm and a linear speed of 1 m/min. The image became sharp by the action of the lower layer acting as a reflection layer. Even when the recording paper was dipped in water, no dye elution was observed. The density in the area where the three colors of cyan, magenta and yellow were superposed was 0.68 prior to the heat-treatment, but became 1.20 by the heat-treatment.

EXAMPLE 5

One hundred parts of high pressure polyethylene synthetic pulp having an average fiber length of 0.9 mm and a melting point of 131° C. was disintegrated and 1 part of a polyamide-polyamine-epichlorohydrin resin was added thereto to provide an upper layer and a lower layer material.

A mixture of 80 parts of LBKP and 20 parts of NBKP was beaten to a freeness of 350 ml, and 8 parts of titanium dioxide, 1 part of rosin, 2 parts of aluminum sulfate and 0.5 part of a polyamide-polyamine-epichlorohydrin resin were added thereto to provide an intermediate layer material.

Then a three layer combination paper with a basis weight of 140 g/m$^2$ was produced by combining the upper layer of 40 g/m$^2$, the intermediate layer of 70 g/m$^2$ and the lower layer of 30 g/m$^2$ by use of a cylinder paper machine.

The same ink-jet recording as employed in Example 1 was applied onto the upper layer of this recording paper, which was then subjected to the same heat-treatment as in Example 4.

The upper and lower layers were both converted into a film, and sharp and glossy images were obtained. After the recording, the water resistance of the image was greatly improved. Thus it can be seen that this recording paper is suitable for outdoor posting purposes.

While the invention has been described in detail and with reference to specific embodiments thereof, it will be apparent to one skilled in the art that various changes and modifications can be made therein without departing from the spirit and scope thereof.

What is claimed is:

1. An ink-jet recording method which comprises applying ink-jet recording onto a synthetic pulp paper comprising at least 10% by weight synthetic pulp, and thereafter applying a heat-treatment at the temperature of softening point of said synthetic pulp or more to the synthetic pulp paper to fuse the synthetic pulp.

2. An ink-jet recording method as in claim 1 which is suitable for forming an ink-jet recording suitable for observation by transmitted light, comprising applying ink-jet recording onto a synthetic pulp paper comprising at least 25% by weight synthetic pulp, and thereafter applying a heat treatment to the synthetic pulp paper to fuse the synthetic pulp.

3. An ink-jet recording method as in claim 1 or 2 wherein the ink-jet recording is multicolor ink-jet recording.

4. An ink-jet recording method as in claim 1 or 2 wherein the synthetic pulp paper comprises synthetic pulp and wood pulp.

5. An ink-jet recording method as in claim 1 or 2 wherein the synthetic pulp comprises a thermoplastic resin polymer selected from the group consisting of homo- or co-polymers of ethylene, propylene, acrylonitrile, acrylate, styrene, vinyl acetate, vinyl chloride and vinylidene chloride, polyamides and polyesters.

6. An ink-jet recording method as in claim 1 or 2 wherein the synthetic pulp paper is a combination paper comprising a plurality of layers.

7. An ink-jet recording method as in claim 1 or 2 wherein the heat-treatment is applied in such a manner that the temperature of the synthetic pulp paper is above the melting point of the synthetic pulp.

8. An ink-jet recording method as in claim 1 or 2 wherein a pressure-treatment is applied to said paper during or after said heat-treatment.

9. An ink-jet recording method as in claim 7, wherein the heat-treatment is applied in such a manner that the temperature of the synthetic pulp paper is above the melting point of the synthetic pulp.

10. An ink-jet recording method as in claim 1 or 2, wherein said synthetic pulp comprises polyethylene synthetic pulp produced by the polymerization method.

11. An ink-jet recording method as in claim 10, wherein the synthetic pulp paper is heated to a temperature between 100° C. and 150° C. for a period of time from 1 second to 10 minutes.

12. An ink jet recording method as in claim 11, wherein a pressure of up to 100 kg/cm$^2$ is applied to the synthetic pulp paper for period of time up to 10 minutes during or after the heat-treatment.

* * * * *